United States Patent
Sharma et al.

(10) Patent No.: US 6,626,416 B2
(45) Date of Patent: *Sep. 30, 2003

(54) ELECTROSTRICTIVE VALVE FOR MODULATING A FLUID FLOW

(75) Inventors: Ravi Sharma, Fairport, NY (US); Gilbert A. Hawkins, Mendon, NY (US); Jeffrey I. Hirsh, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 09/735,012

(22) Filed: Dec. 12, 2000

(65) Prior Publication Data

US 2002/0100888 A1 Aug. 1, 2002

(51) Int. Cl.⁷ ............................ F16K 31/02; F16K 31/00
(52) U.S. Cl. ...................................... 251/129.06; 751/11
(58) Field of Search ........................ 251/11, 4, 129.01, 251/129.06

(56) References Cited

U.S. PATENT DOCUMENTS

| | | | |
|---|---|---|---|
| 2,896,507 A | | 7/1959 | Mast et al. |
| 3,716,359 A | | 2/1973 | Sheridon |
| 4,065,308 A | | 12/1977 | Bergen |
| 4,163,667 A | | 8/1979 | Wysocki |
| 4,242,709 A | * | 12/1980 | Stricker .................. 226/182 |
| 4,492,360 A | * | 1/1985 | Lee et al. .............. 251/129.06 |
| 5,206,557 A | * | 4/1993 | Bobbio .................... 200/1 R |
| 5,287,048 A | * | 2/1994 | Lakin et al. ................. 110/193 |
| 5,350,966 A | * | 9/1994 | Culp ........................... 310/328 |
| 5,452,878 A | * | 9/1995 | Gravesen et al. ...... 251/129.01 |
| 5,495,280 A | | 2/1996 | Gehner et al. |
| 5,581,019 A | * | 12/1996 | Minor et al. ................. 285/910 |
| 5,867,302 A | * | 2/1999 | Fleming ..................... 310/328 |
| 6,050,787 A | * | 4/2000 | Hesketh ................. 251/129.01 |
| 6,091,828 A | * | 7/2000 | Akino et al. ................. 381/170 |
| 6,215,221 B1 | * | 4/2001 | Cabuz et al. .......... 251/129.01 |
| 6,288,472 B1 | * | 9/2001 | Cabuz et al. .......... 251/129.02 |

* cited by examiner

Primary Examiner—Kevin Shaver
Assistant Examiner—D A Bonderer
(74) Attorney, Agent, or Firm—Milton S. Sales

(57) ABSTRACT

An electrostrictive micro-valve is provided for modulating a fluid flow through a cannula or other narrow liquid conduit. The micro-valve includes a valve body having a passageway for conducting a flow of fluid, a valve element formed from a piece of viscoelastic material and disposed in the passageway, and a control assembly coupled to the viscoelastic material for electrostatically controlling the shape of the material to open or close the passageway. The valve element has a flat lower side connected to an inner wall of the passage of the valve body, and an upper side which faces an opposing wall within the passageway. The control assembly includes a pair of electrodes disposed over the upper and lower sides of the valve element. The electrode facing the lower side of the element is patterned so that localized electrostatic forces are generated across the viscoelastic material when a voltage is applied across both electrodes. Localized electrostatic forces generate a sinusoidal ripple throughout the viscoelastic material forming the valve element whose peak portions act as obstructions throughout the valve body that partially or completely obstruct a fluid flow.

17 Claims, 6 Drawing Sheets

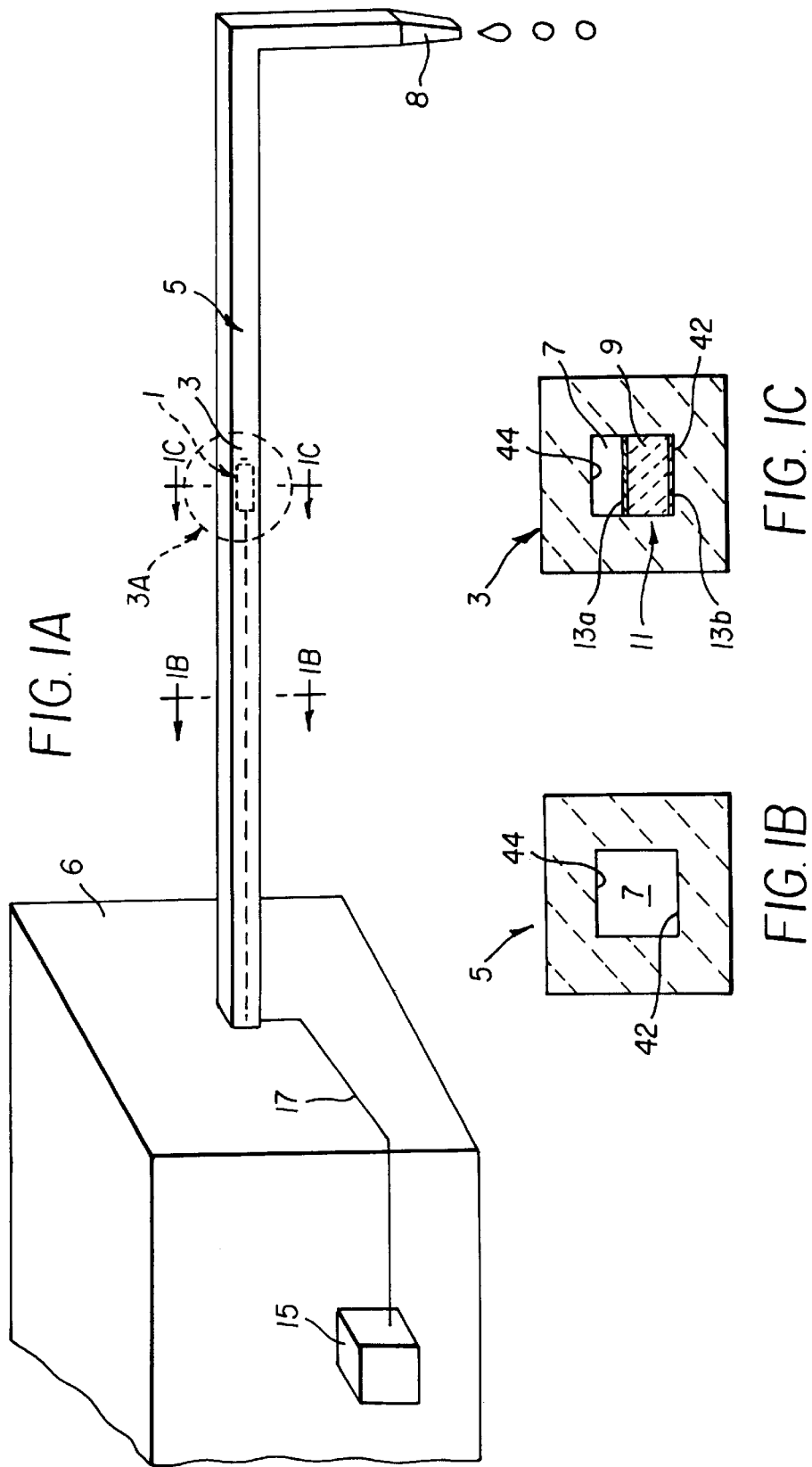

ELECTROSTRICTIVE VALVE FOR MODULATING A FLUID FLOW

CROSS REFERENCE TO RELATED APPLICATIONS

This application includes subject matter that is related to co-pending U.S. patent application Ser. No. 09/708,880 filed Nov. 8, 2000 for "Fluid Pump, Ink Jet Print Heat Utilizing the Same, and Method of Pumping Fluid" by Sharma et al.

FIELD OF THE INVENTION

The present invention relates generally to fluid valves, and more particularly to a micro-valve that utilizes electrostatic forces to form a viscoelastic material disposed in the passageway of a valve body to modulate a fluid flow.

BACKGROUND OF THE INVENTION

Various types of micro-valves are known for modulating a flow of fluid. Such valves find particular use in such fields as analytical chemistry wherein an accurate and measured control of a very small liquid sample is required. Such valves also find application in printers, wherein a precise and rapid control of a flow of a dye, ink, or other image creating liquid is necessary.

Many prior art micro-valves utilize electromechanical mechanisms which while effective are relatively complex and expensive to manufacture on the small scales necessary to modulate small fluid flows. For example, micro-valves utilizing piezoelectric materials are known wherein a valve element is moved into a fluid obstructing or fluid conducting position by the application of electrical impulses on piezoelectric crystals. Unfortunately, piezoelectric crystals are formed from brittle, ceramic materials which are difficult and expensive to machine, particularly on small scales. Additionally, piezoelectric materials generally are not suitable for interfacing with fluids. Thus, valves that exploit piezoelectric movement must be designed to insulate the piezoelectric crystals from contact with liquid materials. Finally, piezoelectric materials generally cannot be fabricated by way of known CMOS processes. Hence, while the electrical circuitry necessary to drive and control piezoelectric movement within a micro-valve may be easily and cheaply manufactured by CMOS processes, the integration of the piezoelectric materials and such circuits requires relatively specialized and slow fabrication steps.

Clearly, there is a need for a micro-valve which is capable of accurately and rapidly modulating a fluid flow without the need for relatively expensive and difficult to machine materials. Ideally, all of the components of such a micro-valve could be manufactured from relatively inexpensive, easily worked with materials which are compatible both with contact with liquids and with CMOS manufacturing techniques.

SUMMARY OF THE INVENTION

Generally speaking, the invention is an electrostrictive micro-valve for modulating a fluid flow that overcomes or at least ameliorates all of the aforementioned shortcomings associated with the prior art. The micro-valve of the invention generally comprises a valve body having a passageway for conducting a flow of fluid, a valve element formed from a piece of viscoelastic material and disposed in said passageway, and a control assembly coupled to the viscoelastic material for electrostatically controlling the shape of the viscoelastic material to open or close the passageway.

The control assembly may include a pair of electrodes disposed on opposite sides of the viscoelastic material. In one embodiment of the invention, the control assembly includes a source of electrical voltage connected across the pair of electrodes, and a switching circuit for selectively applying a voltage from the source across the electrodes to generate an electrostatic force therebetween. One of the electrodes is a flexible, electrically conducting coating disposed over an upper, fluid contacting side of the viscoelastic material, while the other electrode is a plurality of interconnected panels for providing a charge pattern on the other side of the viscoelastic material when the voltage source is connected across the electrodes. The patterned shape of the lower electrode results in localized electrostatic forces across the viscoelastic material that in turn generates a sinusoidal ripple throughout the material whose peak portions act as obstructions throughout the valve body that partially or completely obstruct a fluid flow.

In another embodiment of the invention, the bottom electrode is formed from a layer of photoconductive material which is covered on one surface with a patterned, light-obstructing mask. The control assembly continuously applies a biasing voltage across the upper and lower electrodes. When light is admitted through the openings in the mask, an electrostatic charge pattern is generated between the two electrodes which again results in a sinusoidal ripple pattern in the viscoelastic material that forms the valve element.

The electrostrictive micro-valve of the invention is fabricated from relatively inexpensive and easily worked with materials, and the electrode structure of the control assembly may be easily manufactured by CMOS technology. The inherent elastic properties of commercially available viscoelastic materials advantageously allow the micro-valve of the invention to be operated at frequencies as high as 12.5 kHz.

BRIEF DESCRIPTION OF THE DRAWINGS

FIG. 1A is a perspective view of a cannula in which the electrostrictive micro-valve of the invention is mounted in order to modulate a flow of liquid therethrough;

FIG. 1B is a cross-sectional end view of the cannula illustrated in FIG. 1A across the line 1B—1B;

FIG. 1C is a cross-sectional end view of the cannula illustrated in FIG. 1A across the line 1C—1C illustrating an end cross-sectional view of the micro-valve installed therein;

DETAILED DESCRIPTION OF THE INVENTION

Figure 2A:
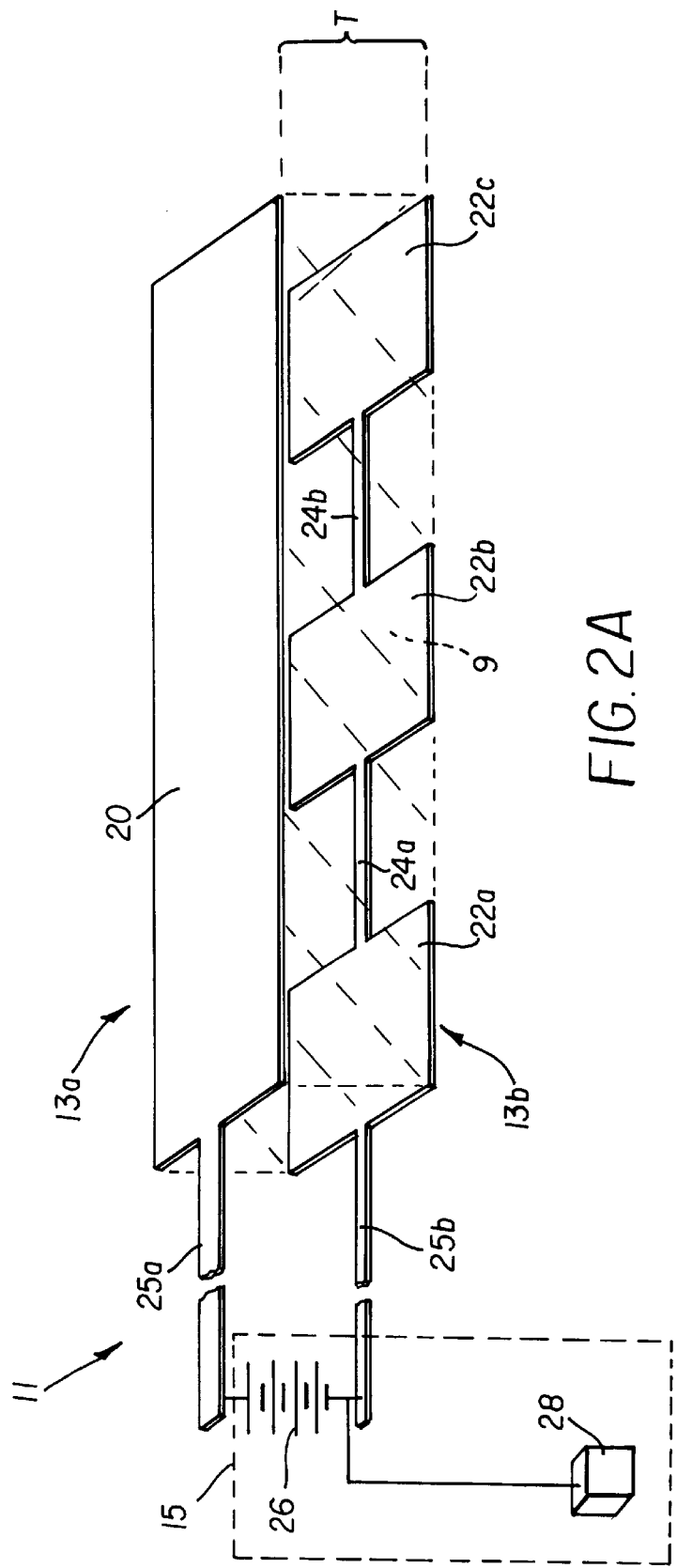
FIG. 2A is a perspective view of the valve element and one embodiment of the control assembly of the invention as they would appear removed from the cannula of FIG. 1A.

With reference now to FIGS. 1A, 1B, and 1C, the electrostrictive micro-valve 1 of the invention includes a valve body 3 which, in this example, is a section of a cannula connected to a pressurized source of liquid 6. In this example, the cannula 5 has a passageway 7 with a substantially square cross section as is best seen in FIG. 1B. The passageway 7 of the cannula 5 extends from the pressurized liquid source 6 to a liquid outlet 8. Outlet 8 may be, for example, a nozzle for injecting micro quantities of solvents or solutions in an analytical chemical apparatus. Alternatively, the pressurized source of liquid 6 may be an ink reservoir, and the cannula 5 and outlet 8 may be used as a pen to mark a moving chart in a measuring apparatus, such as a lie detection or an EKG machine.

With reference now to FIGS. 1C and 2A, the valve element 9 of the electrostrictive micro-valve 1 is a rectangularly-shaped piece of a viscoelastic material such as the silicon elastomer sold as "Sylguard 170" obtainable from the Dow Corning Chemical Corporation located in Midland, Mich. However, the invention is not confined to this one particular material, and encompasses any elastomer having viscoelastic properties. In the preferred embodiment, the thickness T of the viscoelastic material forming the valve element 9 may be 5 to 10 microns thick.

With reference again to FIG. 2A, the control assembly 11 includes upper and lower electrodes 13a, 13b which cover upper and lower surfaces of the valve element 9 in sandwich-like fashion. Electrodes 13a, 13b are in turn connected to a source 15 of electrical voltage via conductor 17 which may be metallic strips fabricated on the surface of the cannula 5 via CMOS technology. The upper electrode 13a may be formed from a thin layer of a flexible, conductive material applied to the upper surface of the valve element 9 by vapor-deposition or another type of CMOS-compatible coating technology. Examples of conductive materials which may be used for layer 20 include electrically conductive polymers such as poly pyrrole, polyanaline, and poly thiophene. Alternatively, a relatively non-reactive metal such as gold, silver, or nickel may be used to form the layer 20. Of course, other conductive metals such as aluminum could also be used but less reactive metal coatings are generally more preferred, since they would be able to interface with a broader range of liquids without degradation due to corrosion. Finally, electrically conductive, diamond-like carbon might also be used. In all cases, the thickness of the layer 20 may be between 0.2 and 1 micron thick. The lower electrode 13b may be formed from the same material as the upper electrode 13a. However, as there is no necessity that the lower electrode 13b be flexible, it may be made from thicker or more rigid electrically-conductive materials if desired. Lower electrode 13b includes a plurality of conductive panels 22a–c electrically connected by way of bridge connectors 24. Conductive strips 25a, 25b interconnect the conductive layer 20 and conductive panels 22a–c to a DC power source 26 by way of a switching circuit 28. In the preferred embodiment, the DC power source 26 is capable of applying voltages on the order of 40 to 120 volts.

Figure 2B:
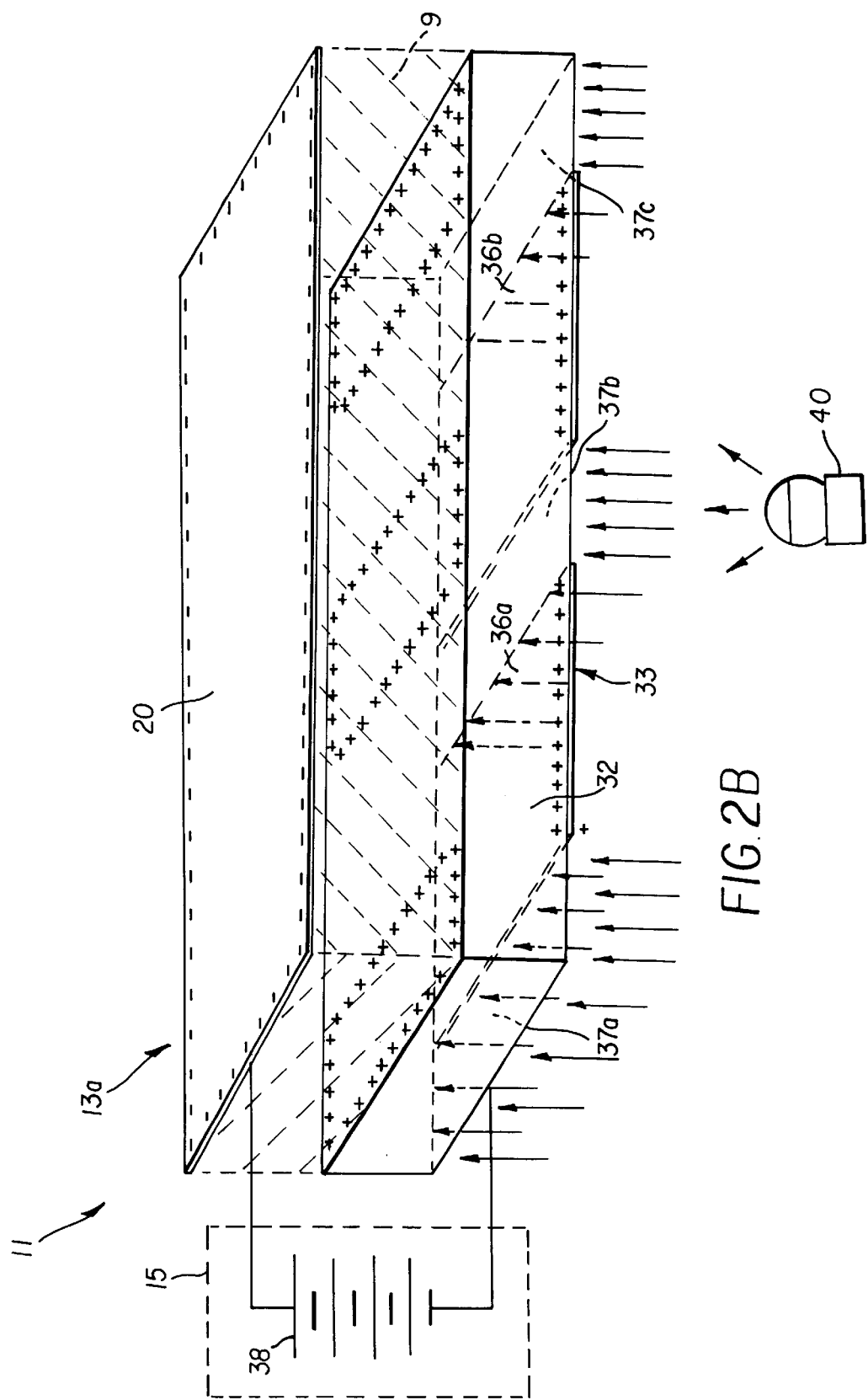
FIG. 2B is a perspective view of the valve element and a second embodiment of the control assembly as they would appear removed from the cannula of FIG. 1A.

FIG. 2B illustrates an alternative embodiment of the control assembly 11 which is photonically (as opposed to electronically) operated. As was the case with the first embodiment, the upper electrode 13a includes a layer of flexible, conductive material which may be formed from the same materials and at the same thicknesses as previously discussed. However, the lower electrode 13b includes a layer of photoconductive material 32 in combination with a light mask 34. The light mask 34 may be applied over the bottom surface of the photoconductive material 32 via standard photolithographic techniques, and defines a pattern of alternating light blocking panels 36 and light conducting windows 37. In this embodiment, the voltage source 15 may be a DC power source 38 that applies a biasing voltage across the upper and lower electrodes 13a, 13b. The final component of the control assembly 11 in this alternative embodiment is a source 40 of laser light for selectively applying laser light through the light conducting windows 37a–c defined between the light blocking panels 36a, 36b.

Figure 3A:
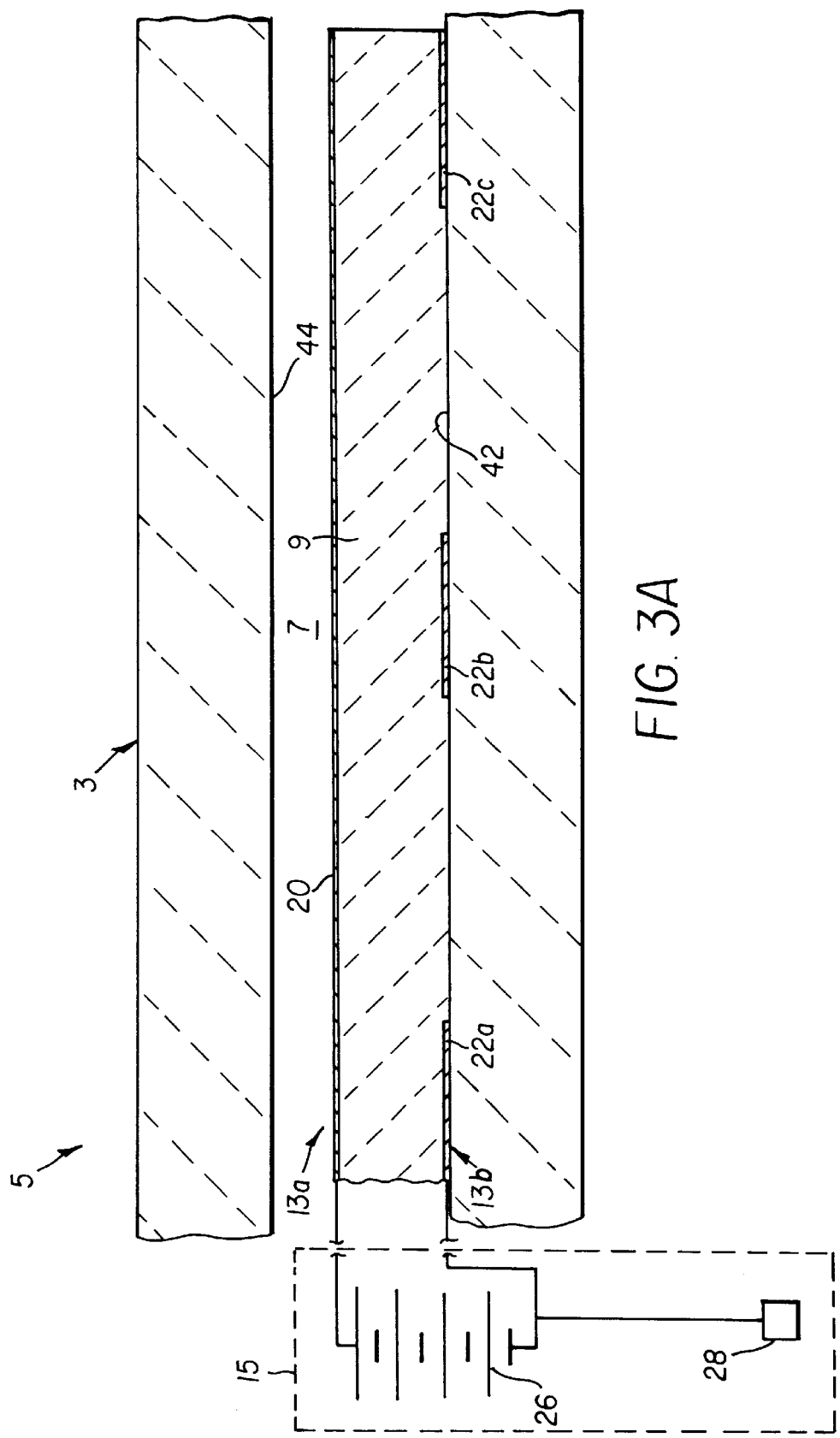
FIG. 3A is an enlarged, cross-sectional side view of the micro-valve illustrated in FIG. 1A with the valve element in a liquid-conducting position.
Figure 3B:
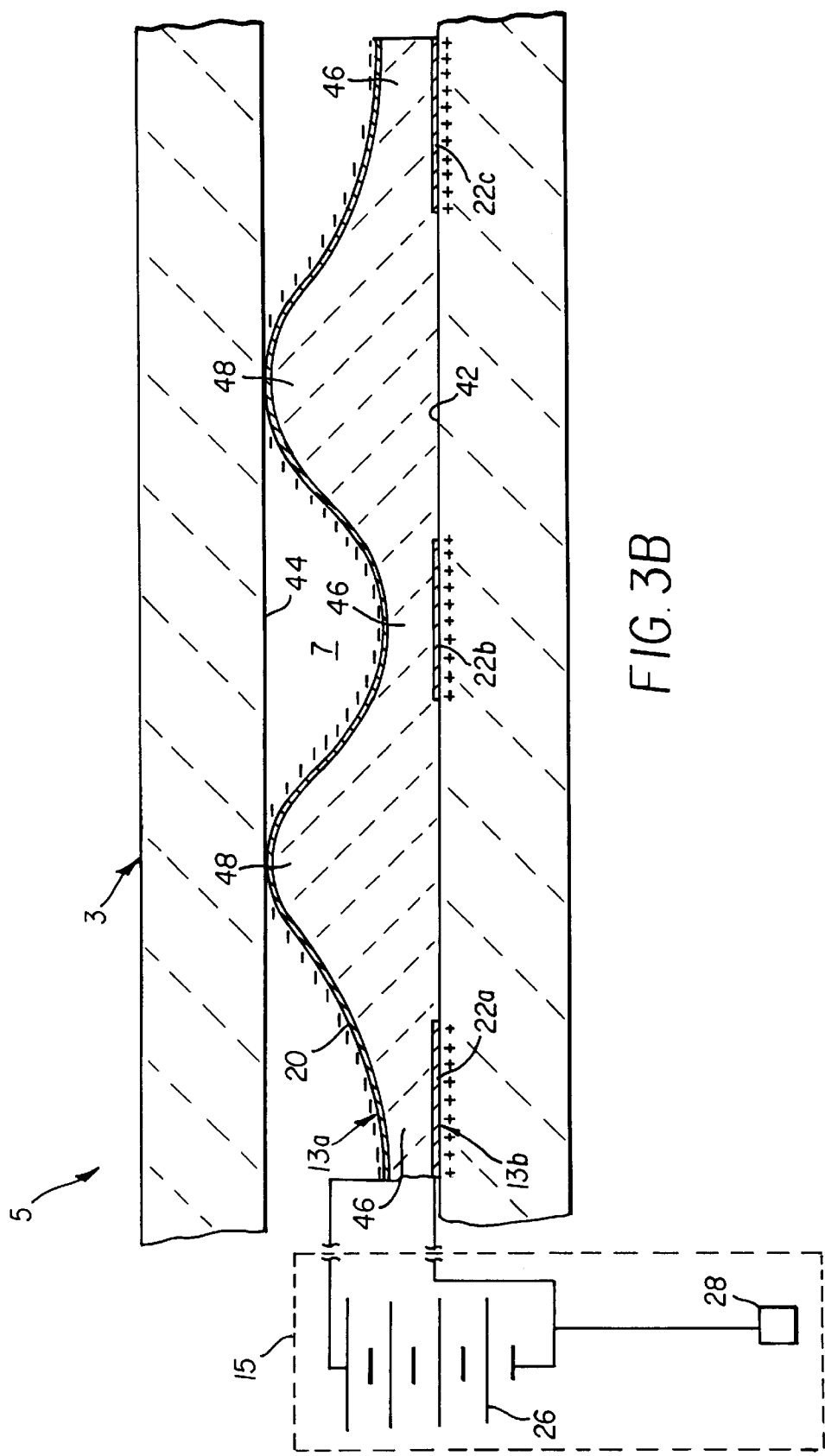
FIG. 3B illustrates the micro-valve of FIG. 3A with the valve element pinched into a liquid-obstructing position by the control assembly.

The operation of the first embodiment of the electrostrictive micro-valve 1 may best be understood with respect to FIGS. 3A and 3B. When no electrical potential is applied between the upper and lower electrodes 13a, 13b, the viscoelastic material forming the valve element 9 adopts the flat-rectangular shape illustrated in FIG. 3A which in turn allows liquid to flow through the passageway 7 of the cannula 5. This flat, rectangular shape of the element 9 is referred to in the context of this application as the "fluid conducting shape" of the element 9. However, when the switching circuit 28 of the control assembly 11 is actuated to conduct a voltage from the DC power source 26 across the upper and lower electrodes as illustrated in FIG. 3B, the electrostatic charges concentrated on the conductive panels 22a–c apply a localized electrostatic force to the flexible, conductive layer 20 over the panels 22a–c, creating a plurality of pinched portions 46 interspersed by enlarged portions 48 of the viscoelastic material forming the valve element 9. Collectively, the pinched and enlarged portions 46, 48 form a sinusoidal ripple throughout the valve element as shown wherein the peaks of the enlarged portions 48 engage the upper inner wall 44 of the passageway 7. Such engagement, of course, obstructs liquid flow through the passageway 7, and the sinusoidal shape of the valve element 9 illustrated in FIG. 3B is, in the context of this application, referred to as the "liquid obstructing shape" of the valve element 9. It should be noted that the relative amplitude of the sinusoidal shape adopted by the valve element 9 is exaggerated in FIG. 3B in order to illustrate more clearly the concept of the invention. Calculations indicate that, for a valve element 9 having a thickness of 8 microns and an axial length of 20 microns, that if a potential of 80 volts is applied between the electrodes 13a, 13b, the resulting amplitude of the sinusoidal deflection will be on the order to 0.2 microns.

The operation of the photonic control assembly 11 illustrated in FIG. 2B is similar to the previously described operation of the embodiment of FIG. 2A, in that the resulting electrostatic field creates pinched and enlarged portions 46, 48 in the valve element 9 which collectively impart a liquid obstructing sinusoidal shape to the element 9. However, the precise manner in which the electrostatic field is created is different. Here, DC power source 38 continuously applies a biasing voltage across the electrodes 13a, 13b. However, when the source of laser light 40 does not apply light through the windows 37a–c of the mask 34, the electrostatic field generated by the source 38 is uniformly applied along the area of both the electrodes 13a, 13b, which results in no change in the shape of the normally rectangular valve element 9. However, when the light source 40 transmits laser light above a threshold amplitude through the windows 37a–c, electron-hole pairs are generated which can migrate to the upper surface of the photoconductive material 32 in the pattern illustrated in FIG. 2B, which in turn allows an alternating pattern of positively charged rectangles to form on the upper surface of the photoconductive layer 32. This alternating positive charge pattern applies an attractive, electrostatic force to the regions of the negatively charged conductive layer 20 immediately above them, thus creating pinched portions 46 which in turn define enlarged portions 48 in the valve element 9.

It has been determined that the amplitude of deformation of the valve element 9 is related to the length of exposure to radiation in the following manner:

$$D = \frac{\gamma}{4}\left[4(VV_{po} - V_{po}^2)\left(\frac{t}{tr}\right) + 2(3V_{po}^2 - VV_{po})\left(\frac{t}{tr}\right)^2 - 4V_{po}^2\left(\frac{t}{tr}\right)^3 + V_{po}^2\left(\frac{t}{tr}\right)^4\right]$$

γ=a material constant of the elastomer

V=d.c. bias voltage applied uniformly to the device and maintained constant during the exposure of photo conductor to light.

$V_{po}$=voltage across the photo conductor at the beginning of exposure t=exposure time tr=the response time of the device, i.e., the time it takes for the voltage across the photo conductor layer to decrease to zero during the exposure.

See J. Appl. Physics 48, 2346 (1977), the disclosure of which is incorporated herein by reference.

It has further been determined that both embodiments of the electrostrictive micro-valve are capable of operating at frequencies on the order of 12.5 kHZ.

Figure 4:
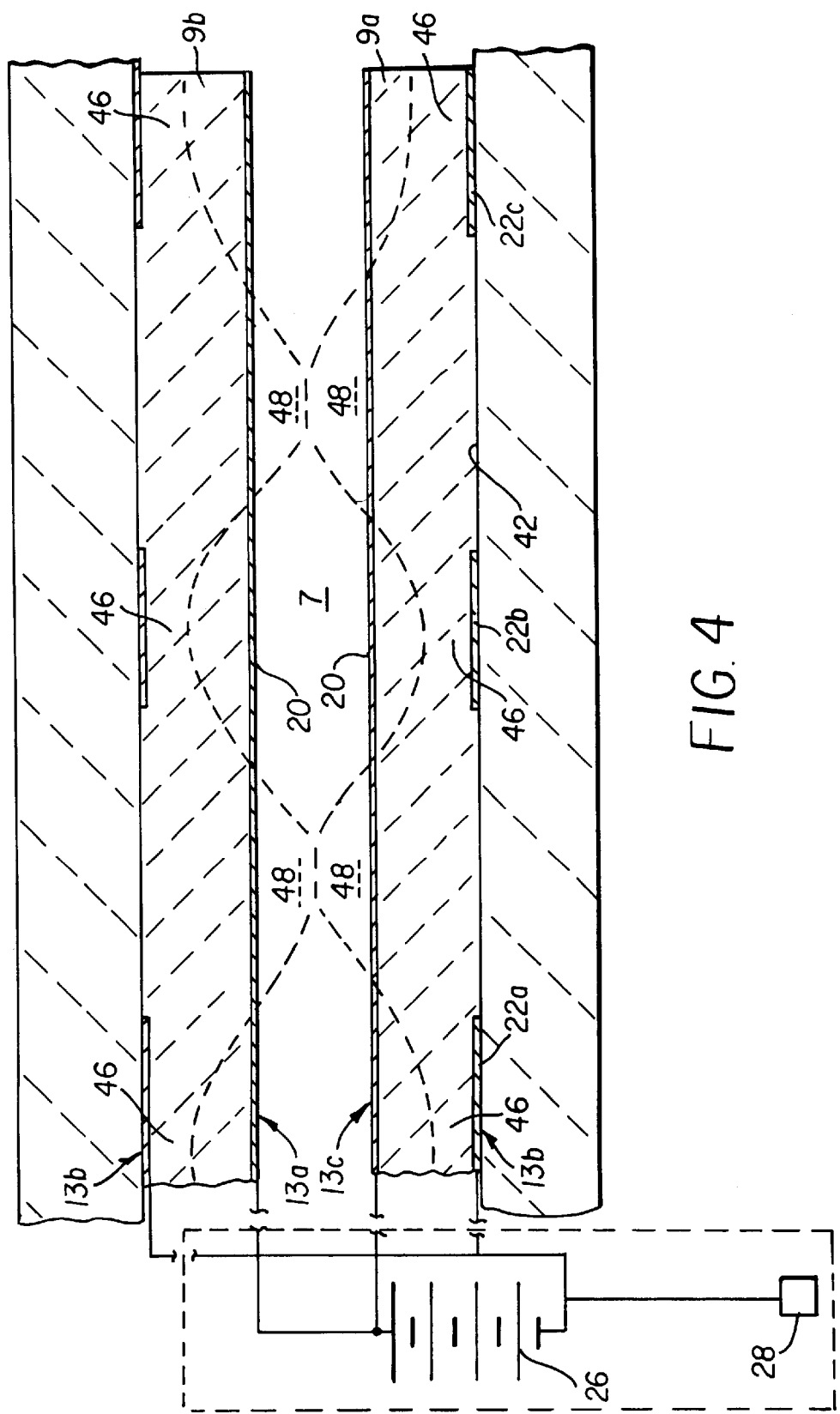
FIG. 4 is a side cross-sectional view of still another embodiment of the micro-valve of the invention which includes a pair of opposing, cooperating valve elements.

FIG. 4 illustrates still another embodiment of the electrostrictive micro-valve 1 of the invention. In this embodiment, two valve element 9a, 9b are mounted over the lower and upper inner walls 42, 44 of the passageway 7, respectively. Each of these valve elements is in turn sandwiched between a pair of electrodes 13a, 13b as shown. In operation, when the switching circuit 28 connects the DC power source 26 to both pairs of electrodes 13a, 13b, the peaks of the enlarged portions 48 engage as illustrated in order to obstruct liquid flow through the passageway 7. There are two advantages associated with the FIG. 4 embodiment. First, the available cross-section of passageway 7 open when the valve elements 9a, 9b are in liquid conducting shape is twice as great as when only a single valve element 9 is used. Second, the inter-engaging peaks of the enlarged portions 48 form a tighter liquid seal than when only a single element 9 is used.

It should be noted that, in all cases, the switching circuit 28 also preferably has the capacity to change the polarity of the DC power source in order to more positively pull-back the valve element 9 into a liquid conducting shape, as opposed to relying exclusively upon the viscoelastic properties of the element 9 to do so. Such a polarity-charging ability advantageously increases the frequency of operation of the valve between open and closed positions.

While this invention has been described in terms of several preferred embodiments, various modifications, additions and other changes will become evident to persons of ordinary skill in the art. All such variations, modifications, and additions are intended to be encompassed within the scope of this patent application, which is limited only by the claims appended hereto and their various equivalents.

Parts List

1. Electrostrictive micro-valve
3. Valve body
5. Cannula
6. Pressurized liquid source
7. Passageway
8. Outlet
9. Valve element
11. Control assembly
13. Upper, lower electrodes a, b
15. Source of electrical voltage
17. Conductors
19. [Electrodes]
20. Layer of flexible, conductive material
22. Conductive panels a–c
24. Bridge connectors
25. Conductive strips a, b
26. DC power source
28. Switching circuit
30. Layer of flexible conductive material
32. Layer of photoconductive material
34. Light mask
36. Light blocking panels
37. Light conducting windows
38. DC power source
40. Light source
42. Lower inner wall (of passageway 7)
44. Upper inner wall (of passageway 7)
46. Pinched portions (of valve element)
48. Enlarged portions

What is claimed is:

1. An electrostrictive micro-valve for modulating a fluid flow, comprising:

a valve body having a passageway for conducting a flow of said fluid;

a valve element formed from a piece of viscoelastic material and disposed in said passageway, and a control assembly coupled to said viscoelastic material for controlling the shape of said material to open and close said passageway, wherein said control assembly includes first and second electrodes mounted on opposite sides of said viscoelastic material, and wherein said control assembly includes a source of electrical voltage connected to said first and second electrodes, and a switching means for selectively applying a voltage from said source across said electrodes to generate an electrostatic force therebetween that changes the shape of said viscoelastic material, wherein a valving action is created by said shape change of said viscoelastic material, and a restorative force generated in said material in reaction to said shape change when said electrostatic force is terminated.

2. The electrostrictive micro-valve defined in claim 1, wherein at least one of said electrodes is an electrically conductive coating disposed over one of said sides of said viscoelastic material.

3. The electrostrictive micro-valve defined in claim 2, wherein said coating is a flexible metal coating.

4. The electrostrictive micro-valve defined in claim 2, wherein said coating is an electrically conductive polymer.

5. The electrostrictive micro-valve defined in claim 1, wherein said switching means further functions to selectively change a polarity of electrical voltage applied between said electrodes by said voltage source.

6. The electrostrictive micro-valve defined in claim 1, wherein said valve element is a single piece of viscoelastic material attached to a wall of said passageway.

7. The electrostrictive micro-valve defined in claim 1, wherein said valve element includes two pieces of viscoelastic material each of which is attached to opposing walls of said passageway, and each of which is coupled to said control assembly.

8. The electrostrictive micro-valve defined in claim 1, wherein said control assembly includes a photoconductor for controlling the generation of an electrostatic force between said electrodes to selectively deform said viscoelastic material into a shape that opens and closes said passageway.

9. An electrostrictive micro-valve for modulating a fluid flow, comprising:
- a valve body having a passageway for conducting a flow of said fluid;
- a valve element formed from a piece of viscoelastic material and disposed on a wall in said passageway, and
- a control assembly including first and second electrodes mounted on opposite sides of said viscoelastic material for controlling the shape of said material by the selective generation of an electrostatic field to open and close said passageway, and
- wherein said control assembly includes a source of electrical voltage, and a switching means for selectively applying a voltage from said source across said electrodes to generate an electrostatic force therebetween that changes the shape of the viscoelastic material, wherein a valving action is created by said shape change of said viscoelastic material, and a restorative force generated in said material in reaction to said shape change when said electrostatic force is terminated.

10. The electrostrictive micro-valve defined in claim 9, wherein at least one of said electrodes is an electrically conductive coating disposed over one of said sides of said viscoelastic material.

11. The electrostrictive micro-valve defined in claim 10, wherein said coating is a flexible metal coating selected from the group consisting of gold, silver, aluminum, and nickel.

12. The electrostrictive micro-valve defined in claim 10, wherein said coating is diamond-like carbon.

13. The electrostrictive micro-valve defined in claim 10, wherein said coating is a flexible conductive polymer.

14. The electrostrictive micro-valve defined in claim 13, wherein said coating is selected from one of the group consisting of poly pyrrole, polyanaline, and poly thiophene.

15. The electrostrictive micro-valve defined in claim 9, wherein said first electrode includes a flexible layer of conductive material disposed over one side of said viscoelastic material, and said second electrode includes a layer of photoconductive material disposed over an opposite side of said viscoelastic material, and a light mask for masking selected sections of said photoconductive material from light.

16. The electrostrictive micro-valve defined in claim 15, wherein said control assembly includes a source of biasing voltage connected to said first and second electrodes, and a light source for selectively applying light to said second electrode to cause a patterned electrostatic force to be generated between said electrodes that deflects said viscoelastic material to open and close said passageway.

17. The electrostrictive micro-valve defined in claim 9, wherein said viscoelastic material is a silicon elastomer.

* * * * *